(12) United States Patent
Liu et al.

(10) Patent No.: US 9,354,739 B2
(45) Date of Patent: May 31, 2016

(54) SELF-CAPACITIVE TOUCH CONTROL APPARATUS AND CONTROL METHOD THEREOF

(71) Applicant: MStar Semiconductor, Inc., Hsinchu Hsien (TW)

(72) Inventors: Chun-Chen Liu, Zhubei (TW); Meng-Che Tsai, Zhubei (TW)

(73) Assignee: MStar Semiconductor, Inc., Hsinchu Hsien (TW)

( * ) Notice: Subject to any disclaimer, the term of this patent is extended or adjusted under 35 U.S.C. 154(b) by 169 days.

(21) Appl. No.: 14/054,896

(22) Filed: Oct. 16, 2013

(65) Prior Publication Data

US 2014/0104232 A1    Apr. 17, 2014

(30) Foreign Application Priority Data

Oct. 16, 2012  (TW) .............................. 101138117 A

(51) Int. Cl.
*G06F 3/041*    (2006.01)
*G06F 3/044*    (2006.01)

(52) U.S. Cl.
CPC .............. *G06F 3/0416* (2013.01); *G06F 3/044* (2013.01)

(58) Field of Classification Search
CPC ............................... G06F 3/044; G06F 3/0416
See application file for complete search history.

(56) References Cited

U.S. PATENT DOCUMENTS

| | | | | |
|---|---|---|---|---|
| 2007/0230822 A1* | 10/2007 | Bolender | .............. | G06F 3/0418 382/286 |
| 2008/0157893 A1* | 7/2008 | Krah | ..................... | G06F 3/0418 331/177 R |
| 2008/0158145 A1* | 7/2008 | Westerman | ........... | G06F 3/0418 345/156 |
| 2008/0162996 A1* | 7/2008 | Krah | ..................... | G06F 1/3203 714/27 |
| 2008/0246496 A1* | 10/2008 | Hristov | ................... | G06F 3/044 324/686 |
| 2008/0278178 A1* | 11/2008 | Philipp | ................... | G06F 3/044 324/662 |
| 2009/0256821 A1* | 10/2009 | Mamba et al. | ................. | 345/174 |
| 2010/0295810 A1* | 11/2010 | Nagata et al. | ................. | 345/173 |
| 2011/0084937 A1* | 4/2011 | Chang et al. | ................. | 345/174 |
| 2012/0105371 A1* | 5/2012 | Hotelling et al. | ............. | 345/174 |
| 2012/0139849 A1* | 6/2012 | Syu | ....................... | G06F 3/0416 345/173 |

FOREIGN PATENT DOCUMENTS

CN    1942853 A    4/2007
CN    101441544 B    5/2009

OTHER PUBLICATIONS

Taiwan Office Action dated Aug. 20, 2014, 10 pages.

* cited by examiner

*Primary Examiner* — Quan-Zhen Wang
*Assistant Examiner* — Chun-Nan Lin
(74) *Attorney, Agent, or Firm* — Edell, Shapiro & Finnan, LLC

(57) ABSTRACT

A self-capacitive touch control apparatus includes a plurality of electrodes, a plurality of sensors, and a number determining module. The sensors detect capacitance changes in the electrodes to generate a plurality of sensing results. The number determining module calculates a total sensing amount according to the sensing results, and determines the number of touch points according to the total sensing amount.

5 Claims, 4 Drawing Sheets

SELF-CAPACITIVE TOUCH CONTROL APPARATUS AND CONTROL METHOD THEREOF

This application claims the benefit of Taiwan application Serial No. 101138117, filed Oct. 16, 2012, the subject matter of which is incorporated herein by reference.

BACKGROUND OF THE INVENTION

1. Field of the Invention

The invention relates in general to a touch control system, and more particularly, to a self-capacitive touch control apparatus for implementing multi-touch control.

2. Description of the Related Art

Operating interfaces of recent electronic products have become increasingly user-friendly and intuitive. For example, through a touch screen, a user can directly interact with applications as well as input messages/texts/patterns with fingers or a stylus, thus eliminating complications associated with other input devices such as a keyboard or buttons. In practice, a touch screen usually comprises a touch panel and a display provided at the back of the touch panel. According to a touch position on the touch panel and a currently displayed image on the display, an electronic device determines an intention of the touch to execute corresponding operations.

Existing capacitive touch sensing techniques can be roughly categorized into self-capacitive and mutual-capacitive types. Compared to mutual-capacitive touch panels, self-capacitive touch panels can be implemented through a single-layer electrode with a simpler manufacturing process and lower costs, and thus prevail in many entry-level electronic products.

FIG. 1 shows an example of a self-capacitive touch panel. In a sensing region 100, a plurality of electrodes having planar contours similar to right triangles are disposed. Each of the electrodes is connected to an upper sensor 12 or a lower sensor 14. Capacitance changes detected by the sensors 12 and 14 are transmitted to a controller (not shown) for the controller to determine a user touch position. A current controller generally calculates an x-coordinate of the user touch position in the X-direction according to the equation below:

$$x = \frac{\sum_{i=1}^{N}(C_i * X_i)}{\sum_{i=1}^{N} C_i} \qquad \text{equation (1)}$$

In equation (1), N represents a total number of sensors, $i=1\sim N$, $C_i$ represents a capacitance change detected by an $i^{th}$ sensor, $X_i$ represents an x-coordinate of a center of gravity of an electrode connected the $i^{th}$ sensor in the X-direction.

Further, a current controller generally calculates a y-coordinate of the user touch position in the Y-direction according to the equation below:

$$y = \left(\frac{r*C_U - C_D}{r-1}\right) * \left(\frac{L}{C_T}\right) \qquad \text{equation (2)}$$

In equation (2), r represents a predetermined value associated with a size of the electrodes, $C_U$ represents a total capacitance change detected by all the upper sensors 12, $C_D$ represents a total capacitance change detected by all the lower sensors 14, $C_T$ is a total of $C_U$ and $C_D$, and L represents a height of the electrodes in the Y-direction. In practice, as shown in FIG. 2, the electrodes are long and narrow trapezoids having an upper width dxs and a lower width dxl. The value r is defined as:

$$r \equiv \frac{dxl + 0.9 * dxx}{dxs + 0.9 * dxx} \qquad \text{equation (3)}$$

In equation (3), dxx represents a gap width between two neighboring electrodes.

As seen from equations (2) and (3), the controller of the capacitance touch panel generates only one set of coordinates (x, y) representing one touch position at each time point, and so the one set of coordinates (x, y) is suitable for determination of single-touch control. Limited by current self-capacitive touch sensing mechanisms, existing multi-touch control sensing can only be implemented by more costly mutual-capacitive touch control apparatuses.

SUMMARY OF THE INVENTION

The invention is directed to a novel self-capacitive touch control apparatus and a control method thereof. In the present invention, the self-capacitive touch control apparatus and the control method thereof determine the number of touch points according to a total sensing amount as an index, so as to achieve a low-cost multi-touch control apparatus.

According to an embodiment of the present invention, a self-capacitive touch control apparatus is provided. The self-capacitive touch control apparatus comprises a plurality of electrodes, a plurality of sensors and a number determining module. The sensors detect capacitance changes in the electrodes to generate a plurality of sensing results. The number determining module calculates a total sensing amount according to the sensing results, and determines a number of touch points according to the total sensing amount.

According to another embodiment of the present invention, a control method for a self-capacitive touch control apparatus is provided. The self-capacitive touch control apparatus comprises a plurality of electrodes. The control method comprises: detecting capacitance changes in the electrodes to generate a plurality of sensing results; and calculating a total sensing amount according to the sensing results to determine a number of touch points according to the total sensing amount.

According to yet another embodiment of the present invention, a self-capacitive touch control apparatus is provided. The self-capacitive touch control apparatus comprises a plurality of first electrodes, a plurality of second electrodes, a plurality of sensors and a positioning module. The first electrodes have a shape appearing similar to a right triangle. The second electrodes have a shape appearing similar to a parallelogram. The sensors detect capacitance changes in the first electrodes and the second electrodes to generate a plurality of sensing results. The positioning module determines position information corresponding to a target touch point.

The above and other aspects of the invention will become better understood with regard to the following detailed description of the preferred but non-limiting embodiments. The following description is made with reference to the accompanying drawings.

DETAILED DESCRIPTION OF THE INVENTION

Figure 3:
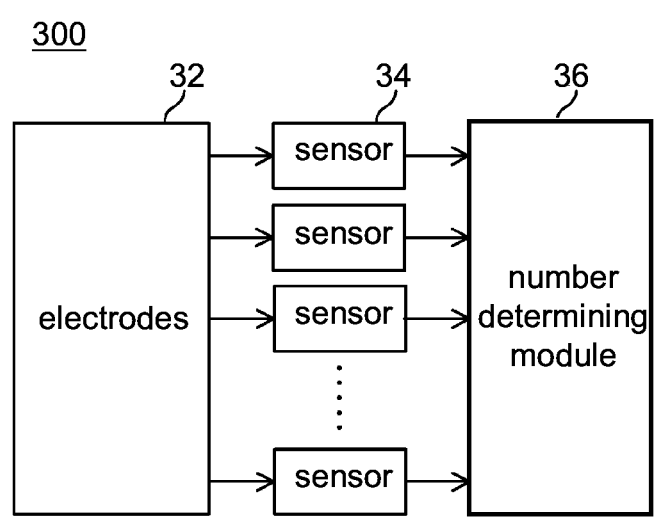
FIGS. 3 and 4 are block diagrams of a self-capacitive touch control apparatus according to embodiments of the present invention.

FIG. 3 shows a functional block diagram of a self-capacitive touch control apparatus according to an embodiment of the present invention. A self-capacitive touch control apparatus 300 comprises a plurality of electrodes (jointly represented by a block 32), a plurality of sensors 34, and a number determining module 36. It should be noted that, the electrodes in the self-capacitive touch control apparatus according to the present invention are not limited to a specific planar contour. For example, the electrodes may be in other planar contours such as a triangle, square, rhombus, bow-like shape and parallelogram. The number of electrodes connected to each sensor is not limited to one. Further, the self-capacitive touch control apparatus 300 may be integrated into various electronic apparatuses with a touch control demand, or may be an independent unit.

The sensors 34 detect capacitance changes in the electrodes 32 to generate a plurality of sensing results. The number determining module 36 calculates a total sensing amount $U_T$ according to the sensing results to accordingly determine a number of touch points. In practice, given an average sensing amount triggered by a single-touch control upon the self-capacitance touch control apparatus 300 is $U_S$, one or more thresholds as a comparison reference can be determined according to $U_S$. For example, the number determining module 36 may utilize $1.5*U_S$ and $2.5*U_S$ as thresholds. When the total sensing amount $U_T$ is smaller than $1.5*U_S$, the number determining module 36 concludes that a current touch control is a single-touch control; when the total sensing amount is between $1.5*U_S$ and $2.5*U_S$, the number determining module 36 concludes the current touch control is a dual-touch control; and so forth. In practice, the value and numbers of the above thresholds may be adjusted according to actual requirements, and are not limited to specific values.

The self-capacitance touch control apparatus 300 may be independently applied in situations where different responses are generated directly according to the number of touch points outputted by the number determining module 36. Alternatively, the self-capacitance touch control apparatus 300 may further comprise a grouping module 37 and a positioning module 38. In the embodiment, in addition to the number of touch points determined, the number determining module 36 further sends the sensing results generated by the sensors 34 to the grouping module 37. The grouping module 37 groups the sensing results according to the number of touch points to generate a grouping result.

Figure 5A:
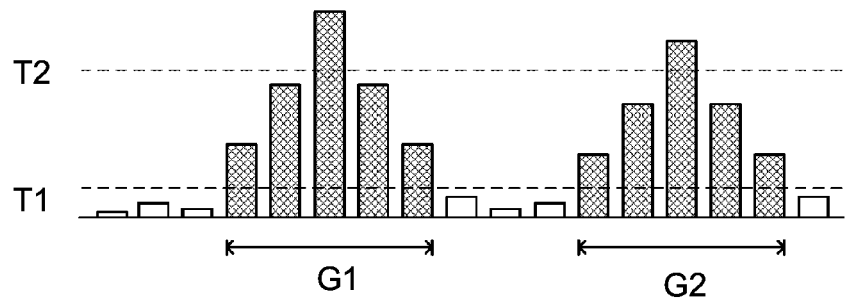
FIGS. 5A and 5B are examples illustrating relations between sensing results and coordinates.
Figure 5B:
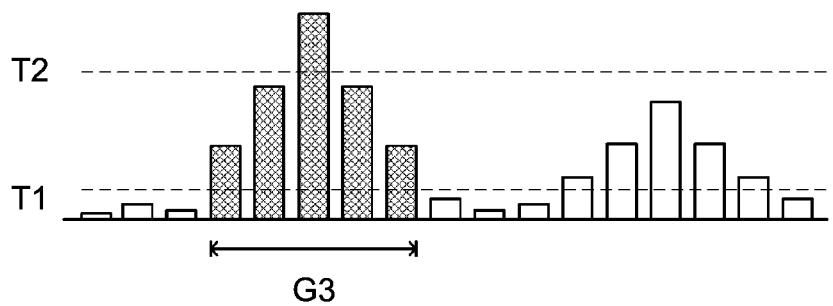

FIGS. 5A and 5B are two types of sensing results generated according to an embodiment of the present invention. In the diagrams, the horizontal axis represents a coordinate in one dimension, and the vertical axis represents sizes of the sensing results corresponding to the coordinates. In FIG. 5A, assuming that the number of touch points determined by the number determining module 36 is two, the grouping module 37 accordingly identifies and determines, from the sensing results, two groups G1 and G2 as the grouping result.

The positioning module 38 then generates position information of one or more touch points according to the grouping result and the sensing results. In the embodiment, the number of touch points determined by the number determining module 36 is two, and thus the positioning module 38 calculates coordinates of the first touch point according to the five sensing results in the group G1, and calculates coordinates of the second touch point according to the five sensing results in the group G2. The position information may be further utilized as a reference for determining a user intention.

Details of how the grouping module 37 identifies and determines the grouping result are given below. In practice, sensing results of touch points display a mountain peak distribution. When identifying an effective sensing result group, from the sensing results, the grouping module 37 may first search for an ascending trend and then a descending trend.

In an embodiment, before grouping, the grouping module 37 first eliminates sensing results that are lower than a first threshold T1 from the sensing results, so as to remove interference sensing results caused by a part of non-ideal factors (e.g., dust) and to determine effective sensing results. Taking FIG. 5A for example, only the sensing results in the groups G1 and G2 are kept while other sensing results lower than the threshold T1 are eliminated.

In another embodiment, the grouping module 37 adopts a second threshold T2 as a basis for group filtering. More specifically, each group of sensing results is required to include at least one sensing result that is greater than the second threshold T2. Taking FIG. 5B for example, only the group G3 satisfying the above condition is selected by the grouping module 37. When the number determining module 36 determines that the number of touch points is two and the grouping module 37 identifies merely one group G3, the grouping module 37 may regard the group G3 as two touch points that are extremely close to each other, and then further divide the group G3 into two sub-groups. It is apparent that the present invention effectively prevents two touch points extremely close to each other from being misjudged as one touch point.

In practice, when the grouping result generated by the grouping module 37 indicates that one target touch point corresponds to an N number of sensing results (where N is a positive integer) among the sensing results, the positioning module 38 may calculate the coordinates (x, y) of the target touch point according to the equations below:

$$x = \frac{\sum_{i=1}^{N}(C_i * X_i)}{\sum_{i=1}^{N} C_i} \quad \text{equation (4)}$$

$$y = \frac{\sum_{i=1}^{N}(C_i * Y_i)}{\sum_{i=1}^{N} C_i} \quad \text{equation (5)}$$

Figure 1:
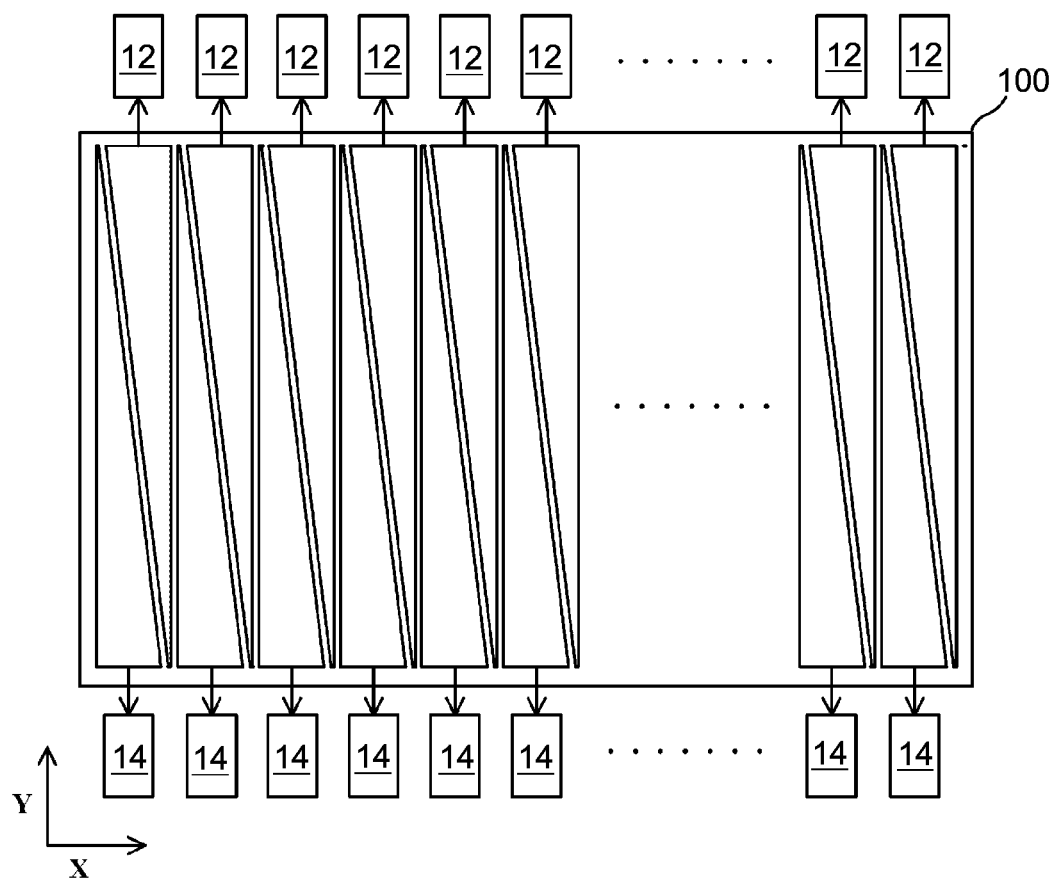
FIG. 1 is an example of a current self-capacitive touch control panel.
Figure 2:
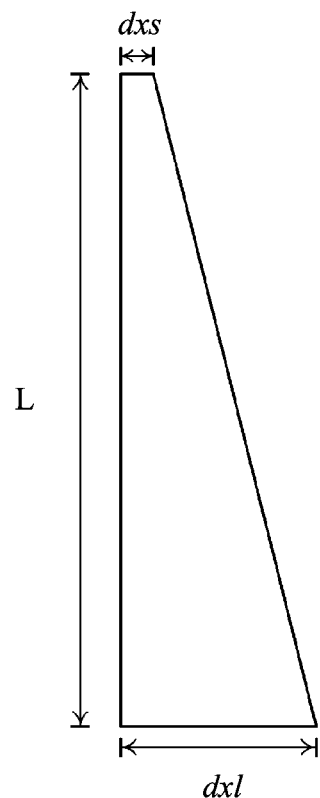
FIG. 2 is an example of a trapezoidal electrode pattern.
Figure 4:
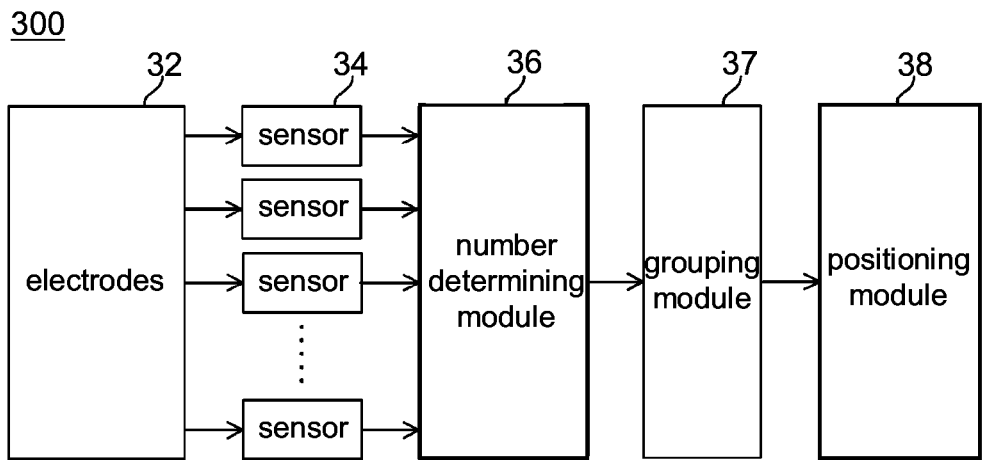
Figure 6:
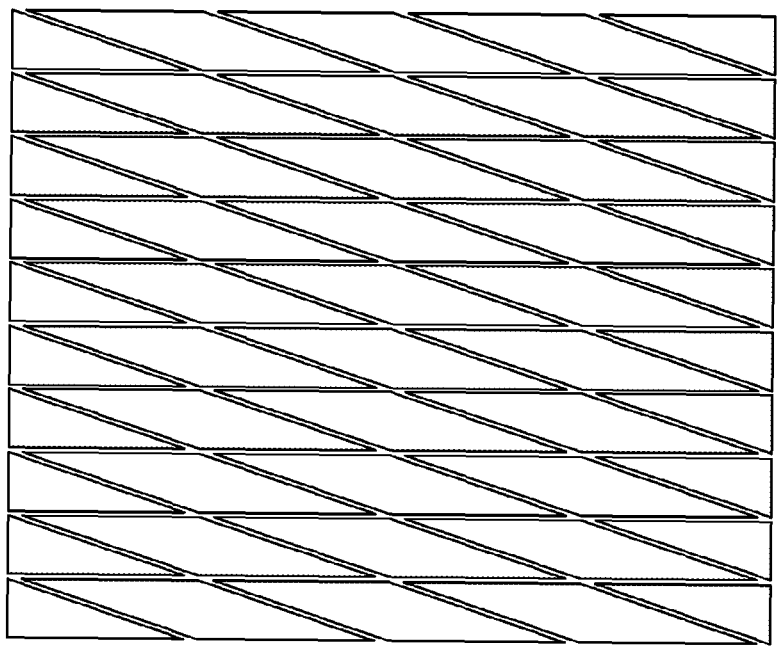
FIG. 6 is an example of an electrode arrangement.

In equations (4) and (5), $C_i$ represents an $i^{th}$ target sensing result in an N number of target sensing results. The $i^{th}$ target sensing result corresponds to at least one electrode among the electrodes 32, $X_i$ represents the center of gravity of the at least one electrode in the X-direction, and $Y_i$ represents the center of gravity of the at least one electrode in the Y-direction. When one target sensing result corresponds to a plurality of electrodes, the above center of gravity is the common center of gravity of the plurality of electrodes. Equations (4) and (5)

are suitable for electrodes in various planar contours, including the electrodes appearing similar to a right triangle in FIG. 1, as well as the situation in FIG. 6 where right-triangle electrodes and parallelogram electrodes exist at the same time. Compared to equation (2), applications of equations (4) and (5) are not limited to the self-capacitive touch control apparatuses shown in FIGS. 3 and 4.

Figure 7:
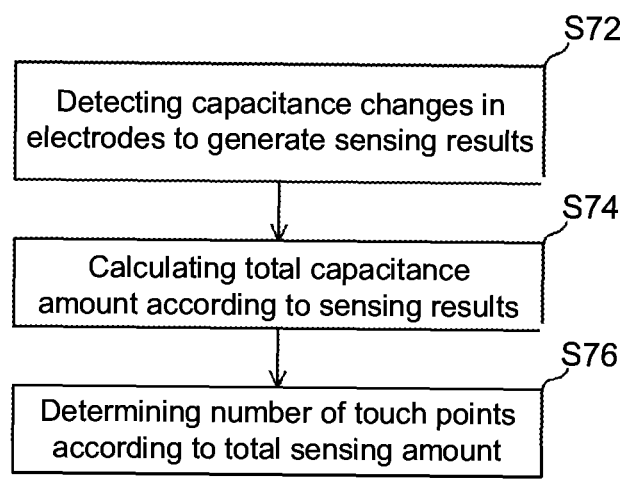
FIG. 7 is flowchart of a control method according to an embodiment of the present invention.

FIG. 7 shows a flowchart of a control method for a self-capacitive touch control panel according to another embodiment of the present invention. The self-capacitive touch control panel comprises a plurality of electrodes. The control method comprises the steps below. In step S72, capacitance changes in the electrodes are detected to generate a plurality of sensing results. In step S74, a total sensing amount is calculated according to the sensing results. In step S76, a number of touch points is determined according to the total sensing amount.

Variations (e.g., grouping and positioning) illustrated when describing the self-capacitive touch control apparatus 300 are applicable to the control method in FIG. 7, and shall be omitted herein.

In conclusion, a novel self-capacitive touch control apparatus and a control method thereof of the present invention are provided as disclosed. In the present invention, the self-capacitive touch control apparatus and the control method thereof determine the number of touch points according a total sensing amount as an index, so as to achieve a low-cost multi-touch control apparatus.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A control method for a self-capacitive touch control apparatus, the self-capacitive touch control apparatus comprising a plurality of electrodes, the control method comprising:
   a) detecting capacitance changes in the electrodes to generate sensing results;
   b) calculating a total sensing amount according to the sensing results, and determining a number of touch points according to the total sensing amount;
   c) grouping the sensing results according to the number of touch points to generate a grouping result; and
   d) generating position information of one or more touch points corresponding to the number of touch points according to the grouping result and the sensing results, wherein the number of touch points is determined by comparing the total sensing amount to a predetermined upper threshold and a predetermined lower threshold.

2. The control method according to claim 1, wherein step (c) comprises eliminating a part of the sensing results according to a first threshold, the first threshold is for removing at least one interference sensing result from the sensing results; step (d) comprises generating the position information of the one or more touch points corresponding to the number of touch points according to the sensing results preserved.

3. The control method according to claim 1, wherein the grouping result is one or more groups of sensing results; each group of sensing results comprises at least one sensing result that is greater than a second threshold, which is for confirming the sensing results correspond to at least one touch point.

4. The control method according to claim 1, wherein the grouping result is one or more groups of sensing results; step (c) comprises searching for an ascending trend and a descending trend from the sensing results, and determining the sensing results between the ascending trend and the descending trend as one group of effective sensing results.

5. The control method according to claim 1, wherein a target touch point indicated by the grouping result corresponds to an N number of target sensing results among the sensing results, where N is a positive integer; step (d) comprises calculating position information of the target touch point according to equations below, the position information comprises a first coordinate x and a second coordinate y:

$$x = \frac{\sum_{i=1}^{N}(C_i * X_i)}{\sum_{i=1}^{N} C_i}; \text{ and}$$

$$y = \frac{\sum_{i=1}^{N}(C_i * Y_i)}{\sum_{i=1}^{N} C_i};$$

wherein, $C_i$ represents an $i^{th}$ target sensing result among the N number of target sensing results, the $i^{th}$ target sensing result corresponds to at least one electrode, $X_i$ represents a first center of gravity of the at least electrode in a first direction, and $Y_i$ represents a second center of gravity of the at least one electrode in a second direction.

* * * * *